US011488531B2

(12) United States Patent
Hamaguchi et al.

(10) Patent No.: US 11,488,531 B2

(45) Date of Patent: Nov. 1, 2022

(54) PROXIMITY SENSOR AND ELECTRONIC DEVICE

(71) Applicant: Sharp Semiconductor Innovation Corporation, Tenri (JP)

(72) Inventors: Kohji Hamaguchi, Fukuyama (JP); Takahiro Inoue, Fukuyama (JP); Masaya Ohnishi, Fukuyama (JP); Isamu Kawabe, Fukuyama (JP)

(73) Assignee: Sharp Semiconductor Innovation Corporation, Tenri (JP)

(*) Notice: Subject to any disclaimer, the term of this patent is extended or adjusted under 35 U.S.C. 154(b) by 0 days.

(21) Appl. No.: 17/346,013

(22) Filed: Jun. 11, 2021

(65) Prior Publication Data

US 2021/0398486 A1 Dec. 23, 2021

(30) Foreign Application Priority Data

Jun. 22, 2020 (JP) ............................ JP2020-107271

(51) Int. Cl.

*G09G 3/3233* (2016.01)
*H04M 1/02* (2006.01)

(52) U.S. Cl.

CPC ... *G09G 3/3233* (2013.01); *G09G 2310/0202* (2013.01); *G09G 2310/0254* (2013.01); *G09G 2310/08* (2013.01); *G09G 2320/02* (2013.01); *G09G 2360/14* (2013.01); *H04M 1/0266* (2013.01)

(58) Field of Classification Search

CPC ... G09G 2320/0233; G09G 2310/0202; G09G 2310/0254; G09G 2310/08; G09G 2360/14; H04M 1/0266

See application file for complete search history.

(56) References Cited

U.S. PATENT DOCUMENTS

| | | | |
|---|---|---|---|
| 2003/0189535 | A1 | 10/2003 | Matsumoto et al. |
| 2005/0253531 | A1 | 11/2005 | Matsumoto et al. |
| 2019/0285735 | A1 | 9/2019 | Hamaguchi |

FOREIGN PATENT DOCUMENTS

| | | | | |
|---|---|---|---|---|
| JP | 2007-147814 A | | 6/2007 | |
| JP | 4052865 B2 | | 2/2008 | |
| JP | 2015210696 | * | 11/2015 | ............ G06F 3/041 |
| JP | 6641469 B2 | | 2/2020 | |

* cited by examiner

*Primary Examiner* — Nelson M Rosario
*Assistant Examiner* — Scott D Au
(74) *Attorney, Agent, or Firm* — ScienBiziP, P.C.

(57) ABSTRACT

A proximity sensor comprises a light emitting element configured to emit light; a synchronization signal input unit configured to be input with a synchronization signal which is output from a display device and which indicates a rewrite timing of an image displayed on a display screen; and an emission controller configured to control emission of the light from the light emitting element, wherein the emission controller is configured to cause the light emitting element to start the emission of the light at a start timing set based on the rewrite timing at which rewriting of one of a plurality of scanning lines of the image is caused to start in the specific display region, and an emission time of the light from the light emitting element, and the emission controller is configured to cause the light emitting element to end the emission of the light before the rewrite timing comes.

6 Claims, 16 Drawing Sheets

PROXIMITY SENSOR AND ELECTRONIC DEVICE

CROSS-REFERENCE TO RELATED APPLICATION

The present application claims priority from Japanese Application JP2020-107271, the content of which is hereby incorporated by reference into this application.

BACKGROUND

1. Field

One aspect of the present disclosure relates to a proximity sensor and an electronic device.

In recent years, mobile devices (electronic devices and, more specifically, portable electronic devices) that include display devices having touch panel functions (for example, display devices provided with liquid crystal screens) such as mobile phones are widely used. The mobile devices have progressed to have multiple functions, and to become smaller and thinner, and a mobile device equipped with a proximity sensor for detecting the presence or absence of an object in proximity to the mobile device appears.

Examples of applications of proximity sensors include prevention of malfunctions of mobile devices. First, an example is given of a case in which the mobile device is a mobile phone having a touch panel function (hereinafter abbreviated as a "mobile phone") to explain the prevention of the malfunction. When there is an incoming call, a user typically performs the action of putting the mobile phone to the ear. At this time, in a case where display of a display screen is on and the touch panel function is active, the mobile phone may malfunction when the display screen touches the user's skin.

In order to prevent such a malfunction, a controller-provided in the mobile phone performs control to switch the touch panel function to either an active state or an inactive state according to a detection result of a proximity sensor. Specifically, when detecting that the user's skin is close to the display screen, the proximity sensor transmits the detection result of the proximity to the controller. The controller that has received the detection result turns off the display of the display screen, and switches the touch panel function from the active state to the inactive state. Then, in a case where the proximity sensor detects that the user's skin is no longer close to the display screen, when the controller receives the detection result, the controller turns on the display of the display screen again, and switches the touch panel function from the inactive state to the active state.

Next, an example is given of a case in which the mobile device is a media player having a touch panel function to explain the prevention of the malfunction. For example, when a user stores the media player in a pocket of clothes, the media player needs to be powered off to prevent a malfunction due to contact between a display screen and fabric of the clothes (or fabric of the pocket) in a case where the media player is not equipped with a proximity sensor. This is because, when the media player is not powered off, the display device cannot be turned off, that is, the touch panel function cannot be deactivated. To power off the media player, typically, a power button provided on the media player is pressed down.

On the other hand, in a case where the media player is equipped with a proximity sensor, the media player need not be powered off even when the user stores the media player in the pocket of the clothes. This is because, in a process in which the user stores the media player in the pocket of the clothes, the proximity sensor detects that the media player and the fabric of the clothes (or the fabric of the pocket) are close to each other. Then, the controller of the media player that, has received the detection result switches the display of the display screen from an on state to an off state, and switches the touch panel function from the active state to the inactive state.

In a process in which the user removes the media player from the pocket, the proximity sensor detects that the media player and the fabric of the clothes (or the fabric of the pocket) are no longer close to each other. Then, the controller of the media player that has received the detection result switches the display of the display screen from the off state to the on state, and switches the touch panel function from the inactive state to the active state.

The controller of the mobile device can perform control as in each of the examples described above based on the detection result of the proximity sensor to prevent a malfunction of the mobile device due to the touch panel function being unintentionally active. Also, in a situation where the touch panel function is unlikely to be used, the display of the display screen is automatically turned off, so the power consumption of the mobile device can be reduced.

The proximity sensors that provide benefits as described above for mobile devices are expected to be mounted to a variety of mobile devices such as mobile phones having touch panel functions, media players and the like. Here, design conditions (i.e., mounting conditions of the proximity sensor), such as a mounting position of the proximity sensor on the mobile device, a shape of a housing surface of the mobile device after the proximity sensor and the like is mounted, vary depending on manufacturers and models of the mobile devices. The reasons for this include constraints on aspects of design and engineering design of the mobile devices. From this background, there is a strong need to achieve proximity sensors that can exhibit characteristics comparable to the various mounting conditions of the proximity sensors.

Note that examples of indexes that indicate the characteristics of the proximity sensors include a detection distance and a probability of occurrence of a malfunction. The detection distance is a distance between a detection object and the proximity sensor when the proximity sensor detects proximity of the detection object. The detection object is an object to be detected by the proximity sensor.

There are a variety of detection methods for the proximity sensors, the proximity sensors of a photodetection method are mounted in small mobile terminals, such as the mobile phones, the media players and the like, described above in many cases. A typical proximity sensor 100 of the photodetection method disclosed in JP 6641469 B will be described below by using FIG. 12 and FIG. 13.

The proximity sensor 100 reflects emission light L1 emitted from a light emitting element 102 in the proximity sensor 100 to a detection object 110, as illustrated in FIG. 12. The detection object 110 is an object to be detected by the proximity sensor 100. Then, the proximity sensor 100 receives reflected light L2 when the emission light L1 is reflected by the detection object 110 by using a light receiving element 103 in the proximity sensor 100. In this way, by receiving the reflected light L2 by using the light receiving element 103, the proximity sensor 100 detects that the detection object 110 is close to the proximity sensor 100.

Specifically, as illustrated in FIG. 13, the proximity sensor 100 includes a sensor controller 101 and an AD converter 104 in addition to the light emitting element 102 and the light receiving element 103. The AD converter 104 converts a light reception signal S103 output from the light receiving element 103 into a digital signal S104. The light reception signal S103 is a current signal corresponding to a light amount of the reflected light L2, and is an analog signal. The digital signal S104 is a signal representing a digital value that correlates with an analog value of a current amount represented by the light reception signal S103. In response to the digital signal S104 output from the AD converter 104, the sensor controller 101 outputs a control signal S105 for controlling an operation of an electronic device (not illustrated) to the electronic device. Note that, as necessary, an input signal S101 may be input to the sensor controller 101 from the outside.

The number of bits of the digital signal S104 generated by the AD converter 104 is generally set to from 8 to 16 bits. An output dynamic range and a resolution of the digital signal S104 can be increased as the number of bits is increased.

The sensor controller 101 may directly output the digital signal S104 input from the AD converter 104 as the control signal S105. Further, the sensor controller 101 may compare the digital value of the digital signal S104 input from the AD converter 104 with a preset threshold value.

In a case where the threshold value is set, for example, the digital value of the digital signal S104 output from the AD converter 104 when a distance X between the proximity sensor 100 and the detection object 110 is 100 mm is set as the threshold value. The sensor controller 101 may compare the digital value of the digital signal S104 input from the AD converter 104 with the threshold value to detect, whether the detection object 110 is close to the proximity sensor 100 or not with the distance X=100 mm as a reference. Note that not by outputting the control signal S105 as a digital value of a plurality of bits but by outputting "0" when the distance X is shorter than 100 mm, and outputting "1" when the distance X is longer than 100 mm, for example, the sensor controller 101 can output the control signal S105 as a signal of a single bit.

In recent years, there has been a tendency for miniaturizing and thinning of bodies of mobile phones to be desired while screens of display devices become larger, and thus, housing frames have progressed to be narrowed. As a result, ensuring spaces for mounting the proximity sensors inside the mobile phones has become difficult, and thus, there are demands for the proximity sensors to be made smaller and thinner, for opening positions of the light emitting elements and the light receiving elements to be improved, and the like.

In addition, liquid crystal display devices have been mainstream as display devices for mobile phones, but mobile phones equipped with an Organic Light Emitting Diode (OLED) display device having advantages such as a high image quality video, a light weight, a wide viewing angle, low power consumption and the like are becoming popular. The liquid crystal display device adjusts the brightness of a display screen by e backlight installed on a back face of a liquid crystal portion. Because of a structure of such a liquid crystal display device, light from the outside is not transmitted to the inner side of the housing on the back face of the liquid crystal display device, and thus, an optical sensor such as a proximity sensor of a photodetection method needs to be disposed on the back face of the frame portion of the housing where the backlight of the liquid crystal display device is not present.

A typical mobile phone 500 equipped with a liquid crystal display device 501 will be described below by using FIG. 14. The liquid crystal display device 501 has a touch panel function, and has both a function as a display unit configured to display various information and a function as an operation input unit configured to accept an input due to a user operation. Additionally, the liquid crystal display device 501 is surrounded by a frame portion 502 of the housing of the mobile phone 500. A driving circuit of the liquid crystal display device and a control circuit for the touch panel function are arranged in a space (hereinafter, referred to as a "frame space") formed at a position where the frame portion 502 is disposed in an inner side of the housing.

Furthermore, various components such as a microphone 503, a camera 504, the proximity sensor 200 and the like are also disposed in the frame space, and regions corresponding to positions where the microphone 503, the camera 504, and the proximity sensor 200 are disposed in the frame portion 502 are opened. The microphone 503 is a sound collector. The camera is an image-capturing device. The proximity sensor 200 is a typical optical sensor of a photodetection method. In this way, since openings have to be formed in the frame portion 502, a display region of the liquid crystal display device 501 becomes narrower, and design properties and appearance of the mobile phone are also influenced.

On the other hand, since a backlight is not necessary for the OLED display device, only a very little light from the outside is transmitted to an inner side of the housing on the back face of the OLED display device. Thus, an optical sensor such as a proximity sensor of the photodetection method can be disposed in the inner side of the housing on the back face of the OLED display device. Specifically, as illustrated in FIG. 15, for example, in a case where an OLED display device 601 is used as a display device, in a mobile phone 600, an optical sensor 300 can be installed in an inner side of a housing 610 on a back face of the OLED display device 601.

As described above, by disposing the optical sensor 300 in a space on the back face side of the OLED display device 601 in the inner side of the housing 610, it is not necessary to increase a size of the housing 610 by a size of the optical sensor 300. As a result, a size of the display device can be increased without changing a size of the mobile phone 600 by mounting the optical sensor 300. In addition, since it is not necessary to form an opening for the optical sensor 300 in a frame portion of the housing 610, a reduction in design properties and appearance of the mobile phone 600 due to the formation of the opening can be avoided.

Next, a driving principle of a typical OLED display device of an active matrix drive system disclosed in JP 4052365 B will be described by using FIG. 16. As illustrated in FIG. 16, a pixel 410 of the OLED display device includes an OLED element 411, a thin film transistor 412 configured to perform switching, a thin film transistor 415 configured to drive an OLED element, and a charge holding capacitor 414. In the following description, the thin film transistor 412 configured to perform switching is referred to as a "first TFT 412", and the thin film transistor 413 configured to drive the OLED element is referred to as a "second TFT 413".

A gate electrode of the first TFT 412 is connected with a gate line GL, and a source electrode thereof is connected with a data line DL. The first TFT 412 is switched between on and off by an input voltage of the gate line GL. A data signal input to the data line DL is held in the charge holding capacitor 414 connected between a drain electrode of the first TFT 412 and a gate electrode of the second TFT 413 when the first TFT 412 is turned on.

A voltage corresponding to the data signal input via the first TFT 412 is supplied to the gate electrode of the second TFT 413. The second TFT 413 supplies a current corresponding to a voltage value of the voltage supplied to the gate electrode from a power supply line VL to the OLED element 411. In the OLED element 411, light emitting molecules are excited by recombination of holes injected from an anode and electrons injected from a cathode in a light emitting layer. Then, when the light emitting molecules return to a ground state from an excited state, the CLEO element 411 emits light.

Light emission luminance of the OLED element 411 is substantially proportional to the current supplied to the OLED element 411. From this, by inputting the data signal as described above to each of a plurality of pixels 410 included in the OLED display device to control the current flowing in the OLED element 411, the OLED element can be caused to emit light with the light emission luminance corresponding to the data signal. Thus, the desired image display can be performed on the entire OLED display device.

Here, a frame rate of a frequency of 60 Hz is generally applied to a typical display device. The frame rate is a rewrite frequency of the image of the display device. When the frame rate is 60 Hz, a rewrite cycle of the image of the display device is approximately 16667 μs. Thus, for example, in a case where the frame rate is set to 60 Hz in the OLED display device disclosed in JP 4052865 B, the charge holding capacitor 414 needs to maintain a voltage level of the input data signal in a duration of 16667 μs after the image is rewritten.

Next, JP 2007-147814 A points out that a transistor to be used in a light emitting device provided with an OLED element has a problem that a current is generated by irradiating light from the outside, and the light emitting device malfunctions. Additionally, in order to prevent the malfunction, JP 2007-147814 A discloses technology in which an auxiliary wiring line shields light between a peripheral circuit unit configured of two types of transistors and a light emission face.

SUMMARY

Here, in the typical electronic device, a light emission source is not provided on the back face of the OLED display device, and thus, there is generally no light shielding countermeasure applied to the peripheral circuit unit configured of the transistors. Due to this, in the typical electronic device, when a proximity sensor of a photodetection method, for example, is disposed on the back face of the OLED display device, infrared light emitted from the proximity sensor is incident or the OLED display device to irradiate the transistor, and a current is generated in the transistor. The charge holding capacitor in the pixel then charges or discharges electric charges due to the generation of the current.

Thus, the charge holding capacitor causes the infrared light emitted from the proximity sensor to be incident on the OLED display device, thereby making it impossible to maintain a charge amount for maintaining the voltage of the input data signal. As a result, only in the display region irradiated with the infrared light emitted from the proximity sensor in the display screen of the OLED display device (hereinafter, referred to as a "specific display region", which will be described in detail below), a display image becomes abnormal. Note that the display image that is in this abnormal state is referred to as an "abnormal point" in the following description, because the abnormal image portion in the image displayed on the display screen appears as a "point" to the human eyes.

In this regard, the proximity sensor and the like in the specification of JP 6641469 B, and the display device in the specification of JP 4052865 B are not applied with a countermeasure to the abnormal point caused by the infrared light emitted from the proximity sensor. In addition, although the light emitting device of JP 2007-147814 A is applied with a preventive countermeasure against malfunctions of shielding light by using the auxiliary wiring line, this countermeasure is directed to light incident on the light emitting device from the outside, and is not directed to light emitted from the proximity sensor disposed on the back face of the light emitting device. Due to this, the preventive countermeasure against malfunctions disclosed in JP 2007-147814 A is insufficient as the countermeasure against the abnormal point caused by light emitted from the proximity sensor.

One aspect of the present disclosure has been made in view of the problems described above, and an object thereof is to shorten a generation duration of an abnormal point caused by light emitted from a proximity sensor.

To solve the above problems, a proximity sensor according to an aspect of the present disclosure is a proximity sensor disposed at a position corresponding to a position disposed with a specific display region on a display screen of a display device, configured to detect whether or not a detection object is close to the display screen, and including a light emitting element configured to emit light, a synchronization signal input unit configured to be input with a synchronization signal which is output from the display device, and which indicates a rewrite timing of an image displayed on the display screen, and an emission controller configured to control emission of the light from the light emitting element, wherein the emission controller is configured to cause the light emitting element to start the emission of the light at a start timing set based on the rewrite timing at which rewriting of one of a plurality of scanning lines of the image is caused to start in the specific display region, and an emission time of the light from the light emitting element, and the emission controller is configured to cause the light emitting element to end the emission of the light before the rewrite timing comes.

According to the aspect of the present disclosure, a generation duration of an abnormal point caused by light emitted from the proximity sensor can be shortened.

DESCRIPTION OF EMBODIMENTS

Figure 1:
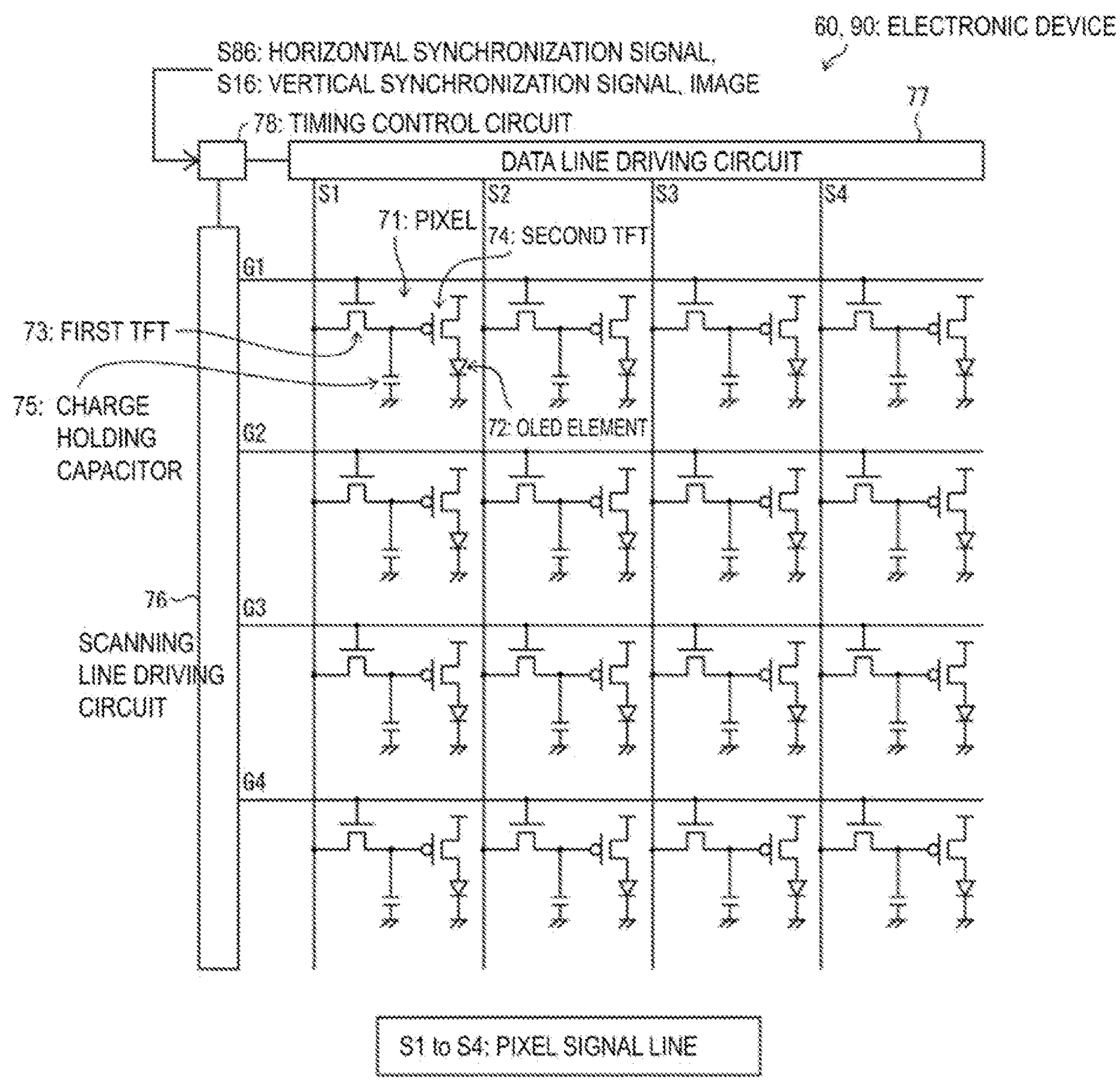
FIG. 1 is a circuit diagram of main portions of a display device of an electronic device according to first and second embodiments of the present disclosure.

Overview of Display Devices of Electronic Devices 60 and 90

Hereinafter, an overview of a display device of an electronic device 60 according to a first embodiment of the present disclosure and an overview of a display device of an electronic device 90 according to a second embodiment of the present disclosure will be collectively described with reference to FIG. 1 and FIG. 2. In this specification, the display device of the electronic device 60 and the display device of the electronic device 90 are identical to each other, and both of the display devices are OLED display devices. Examples of the electronic devices 60 and 90 may include a mobile phone, a home electric appliance having a touch panel function, a smartphone, a tablet terminal, and a media player.

Note that the display device of the electronic device 60 and the display device of the electronic device 90 need not necessarily be identical, and, for example, only one of the display devices may be an OLED display device. In this case, the other display device that is not the OLED display device may preferably be a display device in which even when a proximity sensor 10 or 80 to be described below is disposed on a back face side, both of the proximity sensors 10 and 80 can exhibit their functions. Specifically, the other display device that is not the OLED display device may preferably be a display device in which at least a part of incident light, incident from the outside is transmitted through the back face of the display device so that light reflected from a detection object can be received by a light receiving element 13 (to be described in detail below) of the proximity sensors 10 and 80. Examples of "the other display device that is not the OLED display device" described above may include a display device provided with a self-luminous display panel without a backlight.

Schematic Configuration of Display Device

Figure 2:
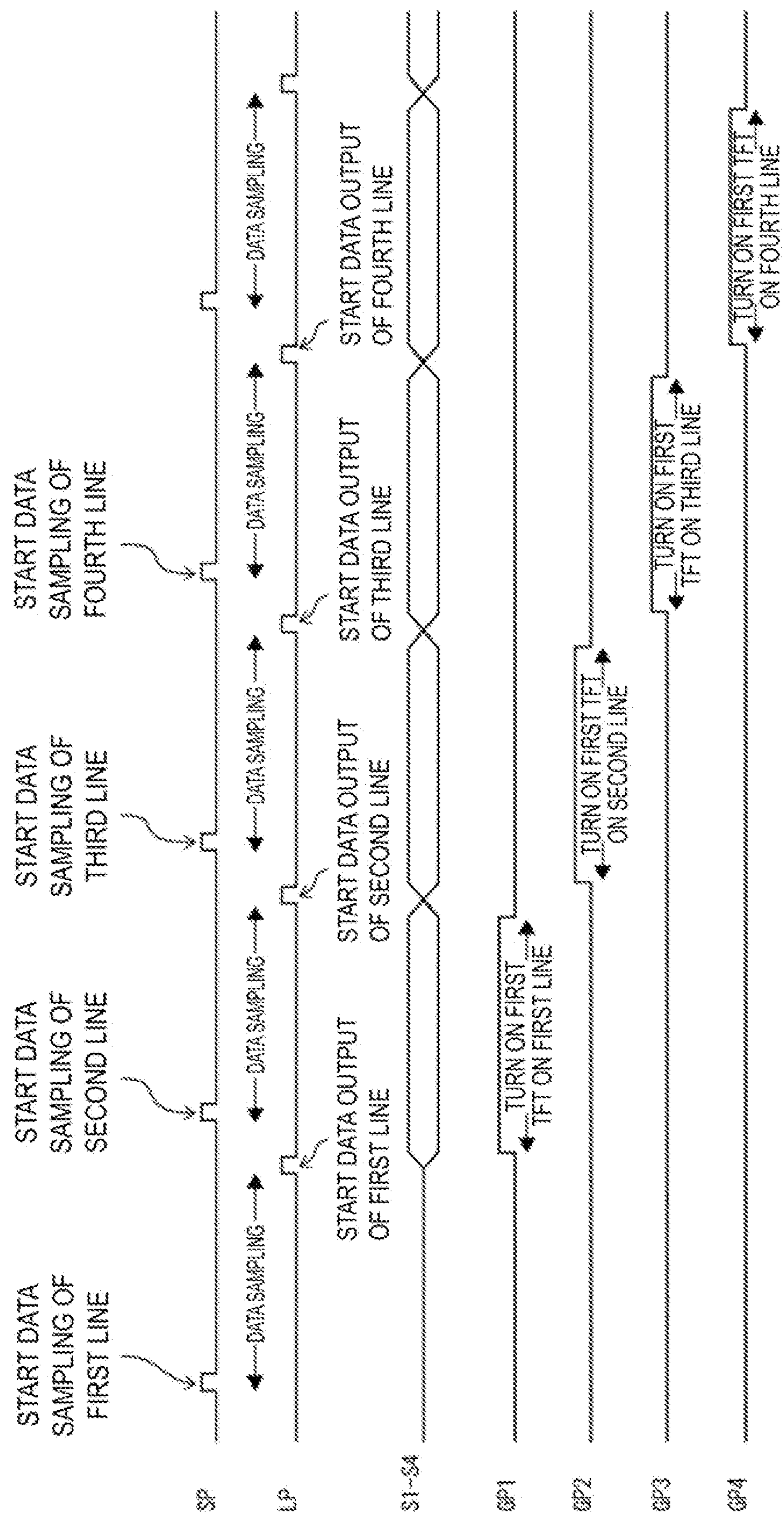
FIG. 2 is a diagram illustrating an operation timing of the display device.

As illustrated in FIG. 1, the display device includes a plurality of pixels 71 arranged in a matrix, a scanning line driving circuit 76, a data line driving circuit 77, and a timing control circuit 78. Each of display screens 61 and 91 of the display device is configured of the plurality of pixels 71. The display screen 61 and the display screen 91 are an identical display screen. See FIG. 8, regarding the display screen 61. See FIG. 11, regarding the display screen 91.

Figure 16:
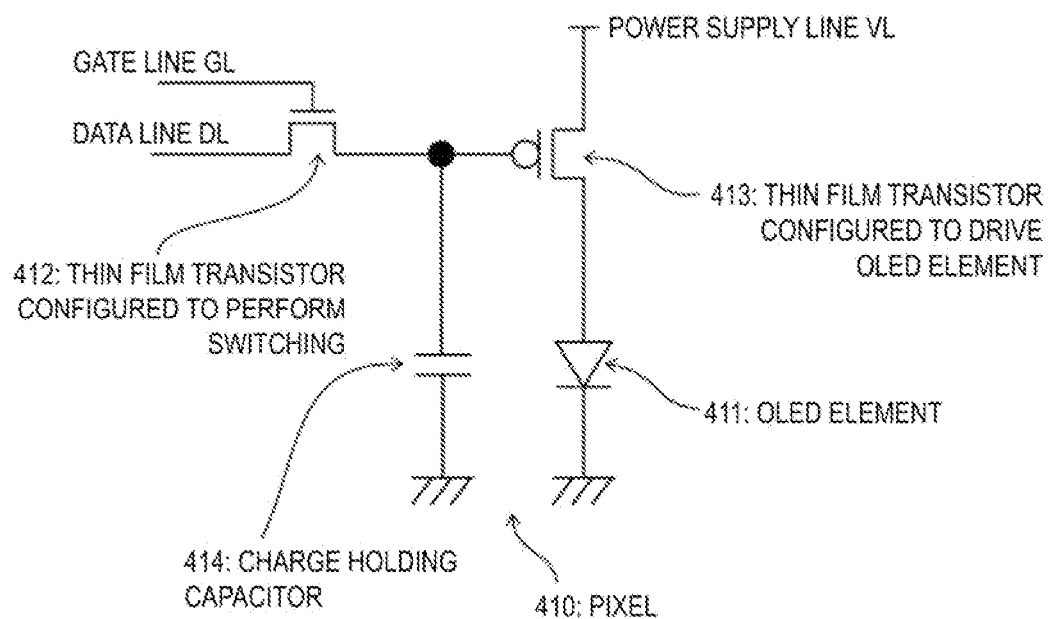
FIG. 16 is a circuit diagram illustrating a configuration of main portions of a pixel of a display device disclosed in the specification of JP 4052865 B.

The pixel 71 includes an OLED element 72, a first TFT 73, a second TFT 74, and a charge holding capacitor 75. The OLED element 72 has an identical function to that of the OLED element 411 illustrated in FIG. 16. The first TFT 73 is a thin film transistor configured to perform switching and has an identical function to that of the first TFT 412 illustrated in FIG. 16. The second TFT 74 is a thin film transistor configured to drive an OLED element, and has an identical function to that of the second TFT 413 illustrated in FIG. 16. The charge holding capacitor 75 is connected between a drain electrode of the first TFT 73 and a gate electrode of the second TFT 74, and has an identical function to that of the charge holding capacitor 414 illustrated in FIG. 16.

A vertical synchronization signal S16, a horizontal synchronization signal S36, and an image are mainly input to the timing control circuit 78. The vertical synchronization signal S16 indicates a start position of one screen of the image, and the horizontal synchronization signal S86 indicates a start position of the image for one line. In other words, the vertical synchronization signal S16 indicates the start of rewriting of the image, and the horizontal synchronization signal S86 indicates the start of rewriting of a scanning line 64 (see FIG. 8). The scanning line 64 is a trajectory of a single row of pixels configuring the image drawn by scanning. Note that in this specification, a "row" extends in a left-right direction with respect to a page.

The timing control circuit 73 is input with the vertical synchronization signal S16, the horizontal synchronization signal S86, and the image to generate a signal that drives the scanning line driving circuit 76 and a signal chat, drives the data line driving circuit 77, and outputs the respective signals (details will be described later).

The signal output from the scanning line driving circuit 76 is input to a gate electrode of the first TFT 73, and the signal output from the data line driving circuit 77 (specifically, the image to be displayed on the display screens 61 and 91) is input to a source electrode of the first TFT 73. When the first TFT 73 is turned on, the signal from the data line driving circuit 77 input to the source electrode is held in the charge holding capacitor 75. Then, a current proportional to a voltage value of the signal held in the charge holding capacitor 75 flows between a source electrode and a drain electrode of the second TFT 74, and thus, light emission luminance of the OLED element 72 is determined.

Operation Timing of Display Device

The timing control circuit 78 generates pulse signals SP and LP based on the input horizontal synchronization signal S86, and outputs the generated signal to the data line driving circuit 77. The timing control circuit 78 generates pulse signals GP1 to GP4 based on the input vertical synchronization signal S16, and outputs the generated signal to the data line driving circuit 77.

Specifically, the timing control circuit 78 outputs the pulse signal SP at a timing indicating an image at the head of each line among images serially input. As illustrated in FIG. 2, the data line driving circuit 77 to which the pulse signal SP has been input starts sampling of the image for each line at a timing when the pulse signal SP is input.

The timing control circuit 73 outputs the pulse signal LP at a timing when the sampling is ended every time the sampling of one line of the image is ended. As illustrated in FIG. 2, the data line driving circuit 77 to which the pulse signal LP is input sequentially outputs analog data corresponding to the image for each line to pixel signal lines S1 to S4 at a timing when the pulse signal LP is input. The analog data is a voltage obtained by DA conversion of the image.

The data line driving circuit 77 sequentially outputs the pulse signals GP1 to GP4 to turn on the gate electrode of the first TFT 73 when the analog data for each line is being output to the pixel signal lines S1 to S4. For example, as illustrated in FIG. 2, when analog data corresponding to an image of a first line is output to the pixel signal line S1, the data line driving circuit 77 outputs the pulse signal GP1 to turn on the gate electrode of the first TFT 73 connected to the pixel signal line S1 of the first line.

Here, each time the vertical synchronization signal S16 is input to the timing control circuit 78, the pulse signals GP1 to GP4 are returned to the first row of pixels 71 to be output. The "first row of pixels 71" refers to a row of pixels 71, among the plurality of pixels 71 illustrated in FIG. 2, disposed on the uppermost side with respect to the page. Thus, a position where a light emitting element 12 provided in the proximity sensors 10 and 80 which will be described below is disposed can be calculated from a frame rate of the vertical synchronization signal S16 and the number of scanning lines 64 which will be described below.

On the other hand, the horizontal synchronization signal S36 is generated as a pulse signal for each image of a single line. Thus, the horizontal synchronization signal S86 itself cannot be used as a synchronization signal (details will be described below) of the proximity sensors 10 and 30. Thus, the proximity sensor 80 is provided with a count signal generation unit 82 (see FIG. 10, details will be described below) configured to generate, from the horizontal synchronization signal S86, a count signal S87 that can be used as a synchronization signal. As a result, even when the horizontal synchronization signal S86 is used, the position at which the light emitting element 12 is disposed can be identified. Note that, for example, by counting SP generated based on the horizontal synchronization signal S86, an emission timing of the light from the light emitting element 12 can be also adjusted (i.e., the position at which the light emitting element. 12 is disposed can be identified).

First Embodiment

The first embodiment of the present disclosure will be described by using FIG. 3 to FIG. 9. Note that, for convenience of description, in the second embodiment which will be described below, members having identical functions to those of members described in the present embodiment will be denoted by using identical reference signs, and descriptions thereof will not be repeated.

Figure 3:
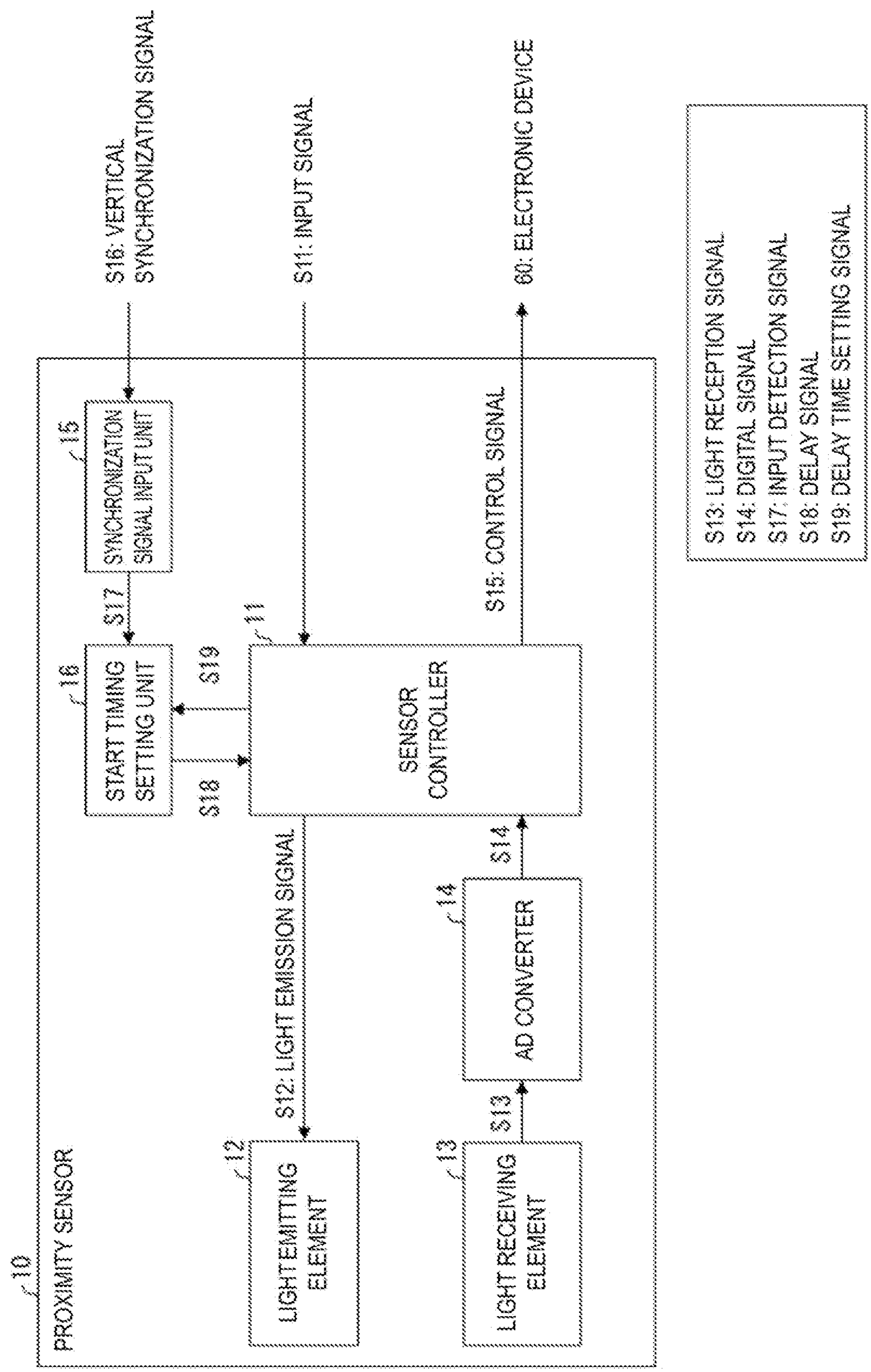
FIG. 3 is a block diagram illustrating a functional configuration of a proximity sensor according to the first embodiment of the present disclosure.
Figure 12:
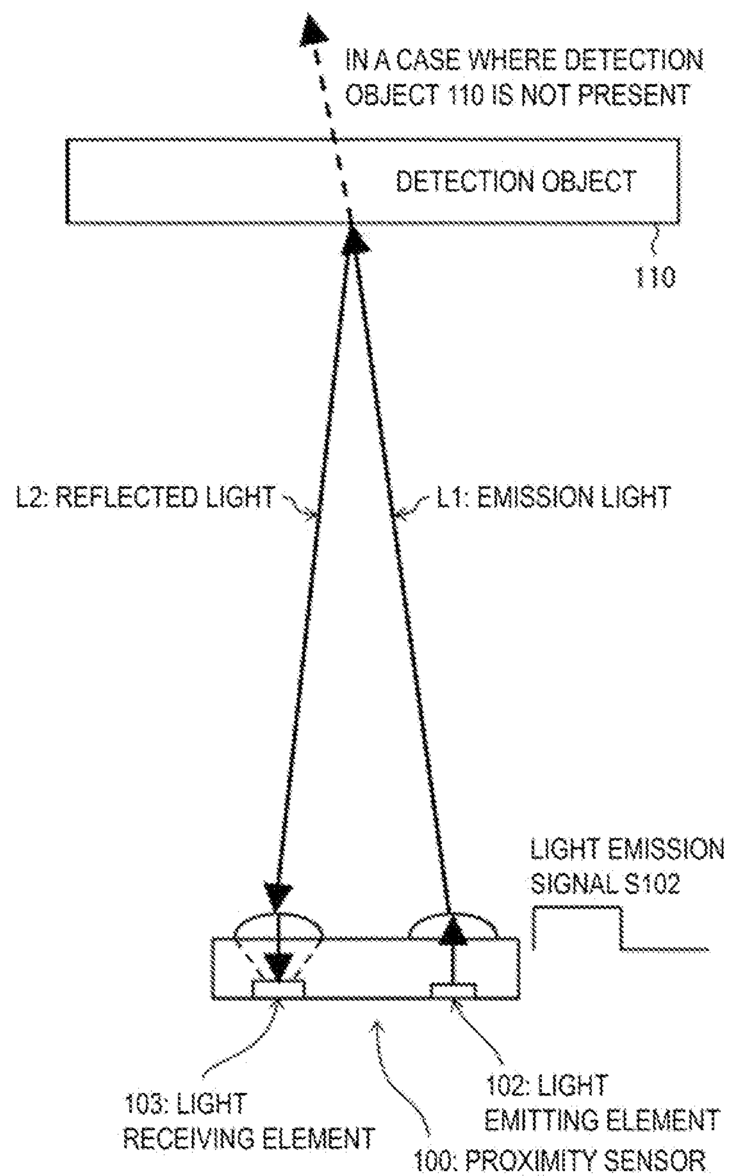
FIG. 12 is a schematic diagram illustrating an operation principle of the proximity sensor disclosed in the specification of JP 6641469 B.

The proximity sensor 10 is an optical sensor of a photodetection method that detects whether or not a detection object (identical to the "detection object 110" in FIG. 12) is close to the display screen 61 (see FIG. 8) of the display device of the electronic device 60. As illustrated in FIG. 3, the proximity sensor 10 includes a sensor controller (emission controller) 11, the light emitting element 12, the light receiving element 13, an AD converter 14, a synchronization signal input unit 15, and a start timing setting unit 16.

Synchronization Signal Input Unit 15

Overview of Synchronization Signal Input Unit 15

A synchronization signal output from the display device is input to the synchronization signal input unit 15. The synchronization signal indicates a rewrite timing of an image displayed on the display screen 61 of the display device. In the present embodiment, as illustrated in FIG. 3, the vertical synchronization signal S16 is input to the synchronization signal input unit 15 as the synchronization signal. When detecting that the vertical synchronization signal S16 is input, the synchronization signal input unit 15 outputs an input detection signal S17 to the start timing setting unit 16.

Here, with reference to FIG. 4, the vertical synchronization signal S16 to be input to the synchronization signal input unit 15 in a case where a frame rate of the display device is 60 Hz will be described. A timing waveform of the vertical synchronization signal S16 in the display device in which a voltage level during normal driving is at a low level and the voltage level is shifted from the low level to a high level at the start of rewriting of the image is a pulse waveform as indicated by a reference sign 401 in FIG. 4, for example. A pulse width of the vertical synchronization signal S16 is different for each electronic device and for each display device, but is generally larger than or equal to several μs. In addition, a cycle of the vertical synchronization signal S16 is an inverse of the frame rate, and when the frame rate is 60 Hz, the cycle is approximately 16667 μs.

Figure 4:
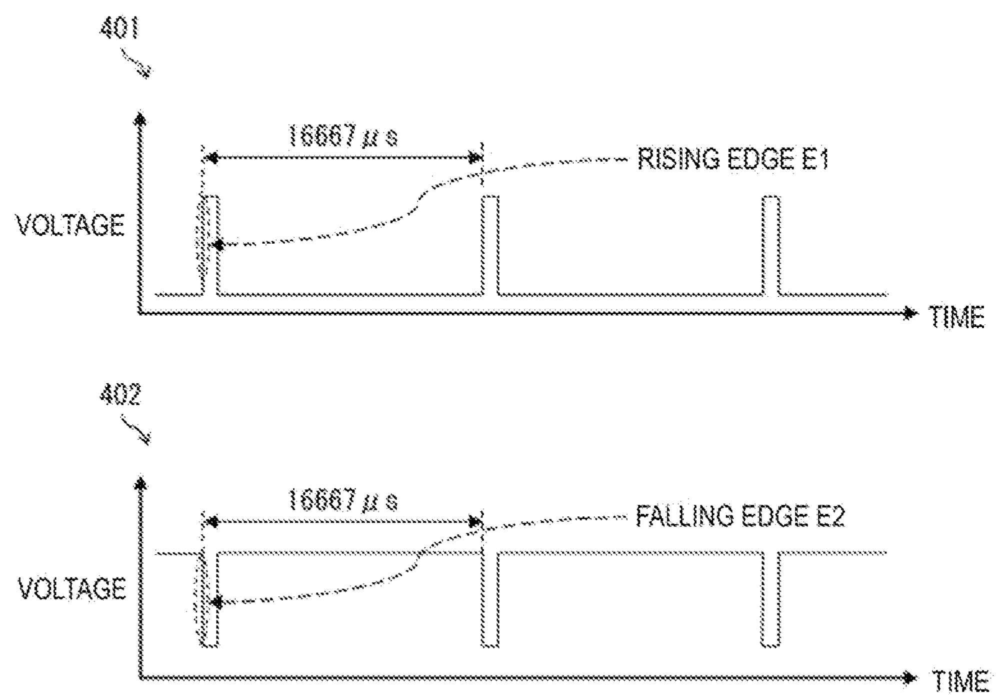
FIG. 4 is a diagram illustrating operation timings of a vertical synchronization signal to be output at 60 Hz. A reference sign 401 is a diagram illustrating the operation timings of the vertical synchronization signal of a high pulse. A reference sign 402 is a diagram illustrating the operation timings of the vertical synchronization signal of a low pulse.

On the other hand, a timing waveform of the vertical synchronization signal S16 in the display device in which a voltage level during normal driving is at a high level and the voltage level is shifted from the high level to a low level at the start of rewriting of the image is a pulse waveform as indicated by a reference sign 402 in FIG. 4, for example. A pulse width of the vertical synchronization signal S16 in this case is generally larger than or equal to several μs, and a cycle is also about 16667 μs.

In this manner, the display device outputs either of the vertical synchronization signals S16 of two different types of pulse waveforms at the identical frame rate (60 Hz). Hereinafter, a type of a pulse waveform of a signal is referred to as "polarity". Additionally, the polarity of the pulse waveform of the signal as indicated by the reference sign 401 in FIG. 4 is referred to as a "high pulse", and the polarity of the pulse waveform of the signal as indicated by the reference sign 402 in FIG. 4 is referred to as a "low pulse".

As described above, since the vertical synchronization signal S16 is not uniform in polarity and pulse width, the synchronization signal input unit 15 preferably detects the input of the vertical synchronization signal S16 at an edge rather than by the pulse width. In the case of the high pulse of the vertical synchronization signal S16, the edge refers to a rising portion E1 of the waveform at the moment when the vertical synchronization signal S16 is shifted from the low level to the high level, as indicated by the reference sign 401 in FIG. 4. Also, in the case of the low pulse of the vertical synchronization signal S16, the edge refers to a falling portion E2 of the waveform at the moment when the vertical synchronization signal S16 is shifted from the high level to the low level, as indicated by the reference sign 402 in FIG. 4. Hereinafter, the edge of the high pulse of the vertical synchronization signal S16 is referred to as a "rising edge E1", and the edge of the low pulse of the vertical synchronization signal S16 is referred to as a "falling edge E2".

It is desirable that the synchronization signal input unit 15 be capable of selecting the detection method so that the display device can detect the input of the vertical synchronization signal S16 either at the rising edge E1 or at the failing edge E2 depending on whether the display device outputs the high pulse or low pulse of the vertical synchronization signal S16. Of course, the input of the vertical synchronization signal S16 may be detected by only either the rising edge E1 or the falling edge E2, or may be detected by the pulse width rather than at the edge.

Configuration of Main Portions of Synchronization Signal Input Unit 15

Figure 5:
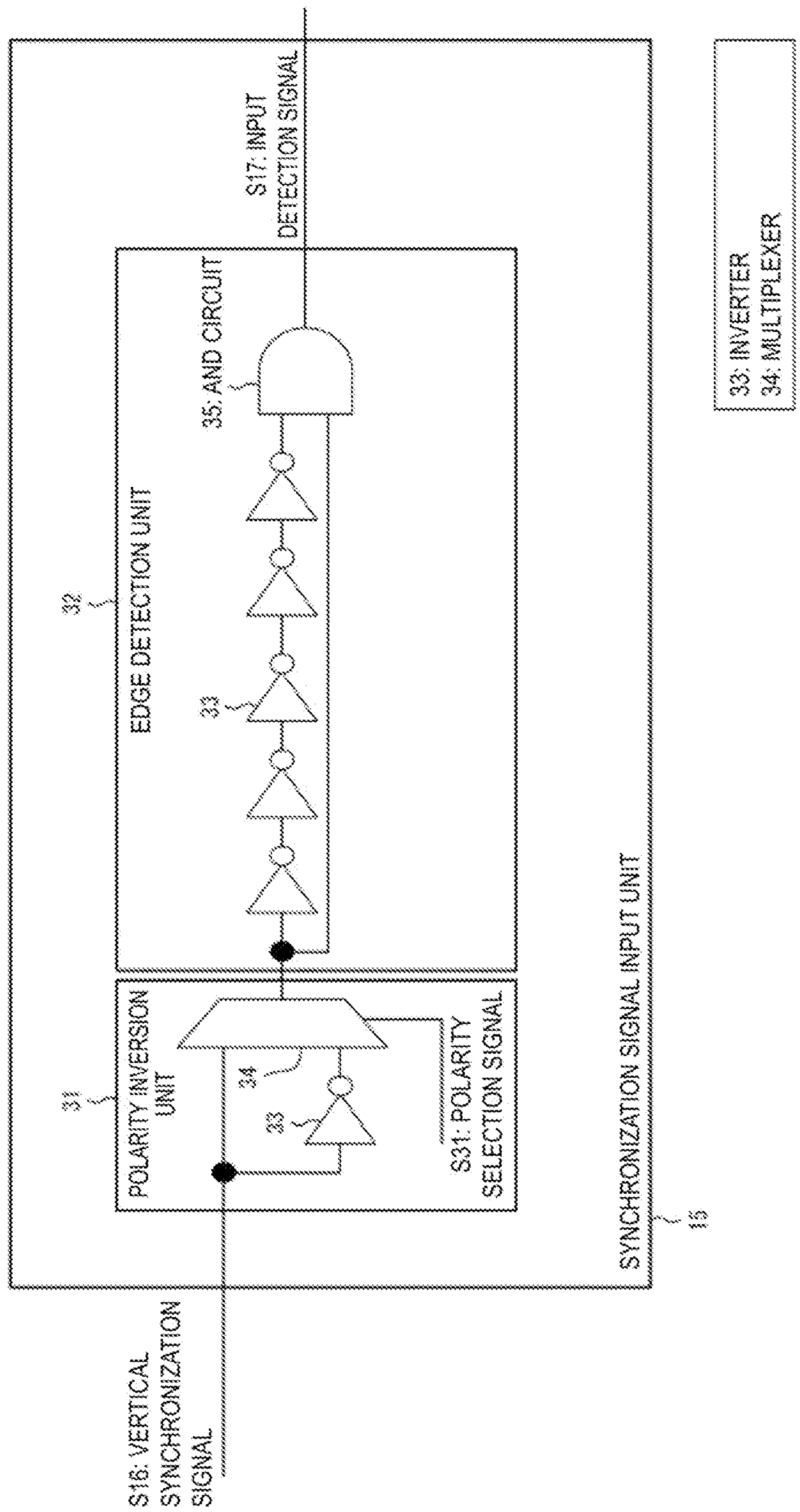
FIG. 5 is a circuit diagram of main portions of a synchronization signal input unit according to the first embodiment of the present disclosure.

A configuration of main portions of the synchronization signal input unit 15 will be described by using FIG. 5. As illustrated in FIG. 5, the synchronization signal input unit 15 includes a polarity inversion unit 31 and an edge detection unit 32. The vertical synchronization signal S16 output from the display device is directly input to the polarity inversion unit 31 of the synchronization signal input unit 15.

According to polarity of the input vertical synchronization signal S16, the polarity inversion unit 31 inverts the polarity. As illustrated in FIG. 5, the polarity inversion unit 31 includes an inverter 33 and a multiplexer 34. The inverter 33 inverts the polarity of the vertical synchronization signal S16 input to the polarity inversion unit 31. The multiplexer 34 is input with the vertical synchronization signal S16 input to the polarity inversion unit 31 and an output signal from the inverter 33, and outputs either of both the signals. The vertical synchronization signal S16 input to the polarity inversion unit 31 and the output signal from the inverter 33 both of which may be output from the polarity inversion unit 31 (specifically, from the multiplexer 34) are collectively referred to as an "inversion signal".

Further, a polarity selection signal S31 is input to the multiplexer 34 as a signal for selecting whether to output the vertical synchronization signal S16 or the output signal that have been described above. For example, in a case where the polarity of the vertical synchronization signal S16 input to the polarity inversion unit 31 is the high pulse, when polarity of the polarity selection signal S31 is low, the multiplexer 34 outputs the vertical synchronization signal S16 (polarity: the high pulse) input to the polarity inversion unit 31 as it is. On the other hand, in a case where the polarity of the vertical synchronization signal S16 input to the polarity inversion unit 31 is the low pulse, when the polarity of the polarity selection signal S31 is high, the multiplexer 34 outputs the output signal (polarity: the high pulse) from the inverter 33.

In this way, the polarity inversion unit 31 outputs the vertical synchronization signal S16 whose polarity is always the high pulse as the inversion signal. Thus, the edge detection unit 32 may have a function of detecting only the rising edge E1.

The edge detection unit 32 detects that the vertical synchronization signal S16 is input to the synchronization signal input unit 15 by detecting an edge of the inversion signal output from the polarity inversion unit 31. In the present embodiment, the edge detection unit 32 only detects the rising edge E1 as described above.

The edge detection unit 32 includes an inverter group configured of an odd number of stages of inverters 33 and an AND circuit 35. The inverter group inverts and delays the inversion signal input to the edge detection unit 32. The inversion signal input to the edge detection unit 32 and an output signal from the inverter group are input to the AMD circuit 35.

When the inversion signal is at the low level, the inverter group outputs the output signal at the high level, and the and circuit 35 outputs the output signal at the low level. Next, when the inversion signal is shifted from the low level to the high level, a delay time occurs depending on the number of stages of inverters 33 until the output signal from the inverter group is shifted from the high level to the low level. Thus, the AND circuit 35 outputs the output signal of the high level because both the two input signals input to the AND circuit 35 are at the high level until the delay time elapses. Next, after the delay time has elapsed, when the output signal from the inverter group is shifted to the low level, the output signal from the AND circuit 35 is also shifted from the high level to the low level.

The output signal from the AND circuit 35 described above is an output signal from the synchronization signal input unit 15. Hereinafter, the output signal from the AND circuit 35, that is, the output signal from the synchronization signal input unit 15, is referred to as an "input detection signal S17".

Note that the circuit configuration of the synchronization signal input unit 15 illustrated in FIG. 5 and the detection method of the input of the vertical synchronization signal S16 described above are merely examples, and any circuit configuration and detection technique may be employed. Moreover, each of the polarity of the vertical synchronization signal S16 output from the display device and the polarity of the input detection signal S17 output from the synchronization signal input unit 15 is not limited to either the high pulse or the low pulse.

Start Timing Setting Unit 16

Overview of Start Timing Setting Unit 16

The input detection signal S17 output from the synchronization signal input unit 15 is input to the start timing setting unit 16. The start timing setting unit 16 sets a start timing at which the light emitting element 12 starts emission of light. In other words, the start timing setting unit 16 has a function of adjusting a time from when the vertical synchronization signal S16 is input to the synchronization signal input unit 15 to when detection is started by the proximity sensor 10. This function is then achieved by the start timing setting unit 16 outputting a delay signal S18 to the sensor controller 11 after a delay time obtained by setting the input of the input detection signal S17 as a trigger has elapsed.

As described above, the fact that "the start timing setting unit 16 sets the start timing" refers specifically to the fact that the start timing setting unit 16 outputs the delay signal S18 to the sensor controller 11. Additionally, the fact that "the start timing is set" refers specifically to the fact that the delay signal S18 is input to the sensor controller 11.

Furthermore, the timing "when the vertical synchronization signal S16 is input to the synchronization signal input unit 15" refers specifically to the timing when the start timing setting unit 16 receives, from the synchronization signal input unit 15, the detection result that the input of the vertical synchronization signal S16 has been detected. In other words, it refers to the timing when the input detection signal 317 output from the synchronization signal input unit 15 is input to the start timing setting unit 16.

The delay time is an example of a differential time between a reference time from the timing when the vertical synchronization signal S16 is input to the synchronization signal input unit 15 to the rewrite timing and an emission time of the light from the light emitting element 12. The rewrite timing Is a timing at which rewriting of the scanning line 64 of the image is started in a specific display region 65 of the display screen 61 of the display device. See FIG. 8, as for each of the display screen 61, the specific display region 65, and the scanning line 64. Also, details of the rewrite timing, the reference time, and the specific display region 65 will be described later.

Figure 6:
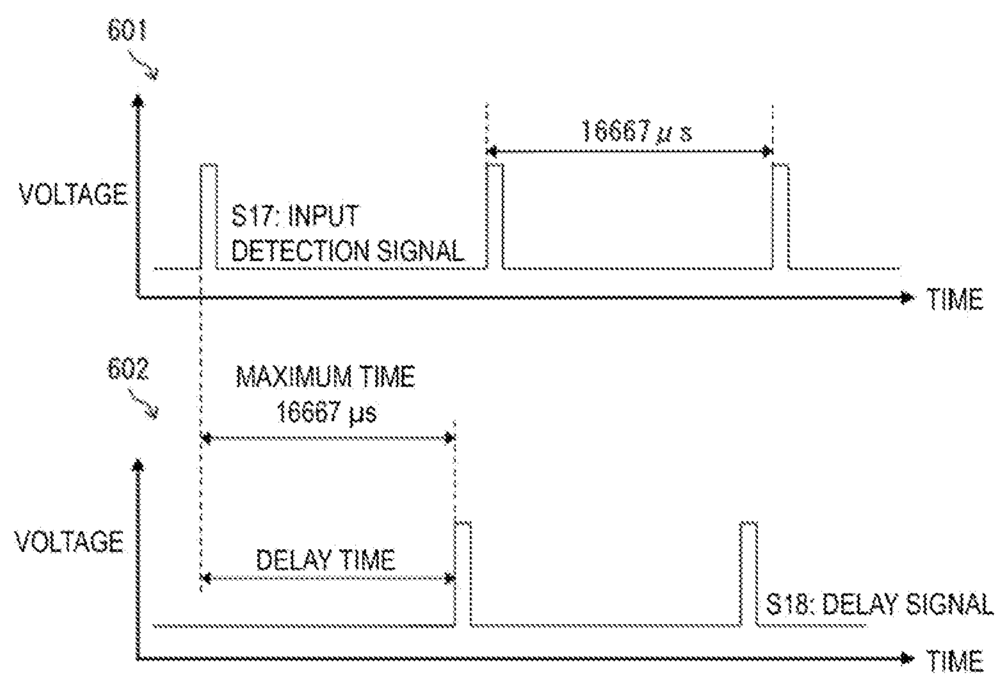
In FIG. 6, a reference sign 601 is a diagram illustrating operation timings of an input detection signal output from the synchronization signal input unit. AA reference sign 602 is a diagram illustrating operation timings of a delay signal output from a start timing setting unit according to the first embodiment of the present disclosure.

Here, setting and adjusting the delay time will be described with reference to FIG. 6. The input detection signal S17 operates at an identical frequency to the vertical synchronization signal S16. Thus, in the case where the frequency of the vertical synchronization signal S16 is 60 Hz, the input detection signal S17 operates at 60 Hz as well, and the cycle is approximately 16667 μs as indicated by a reference sign 601 in FIG. 6.

It is necessary that the start timing setting unit 16 be set up to the cycle of the vertical synchronization signal S16 at longest as the delay time in order to enable the proximity sensor 10 to exhibit its function, even when the proximity sensor 10 is disposed in any space on the back face of the display device of the electronic device 60. Specifically, as indicated by a reference sign 602 in FIG. 6, the start timing setting unit 16 needs to set the delay time up to about 16667 μs at longest. Additionally, an adjustment width of the delay time needs to be set with high accuracy 30 that the detection of the proximity sensor 10 is ended (i.e., the emission of the light from the light emitting element 12 is ended) at the timing when the scanning line 64 of the image is rewritten in the specific display region 65.

For example, in a case where the number of pixels of the display screen 61 of the display device is full high-definition resolution of 1920×1080, and the number of the scanning lines of the image displayed on the display screen 61 is 1920 in total, the scanning lines 64 are rewritten one line by one line every about 8.7 μs at latest. Thus, it is desirable that the start timing setting unit 16 have a circuit configuration in which the delay time can be adjusted in the adjustment width of approximately 10 μs.

Configuration of Main Portions of Start Timing Setting Unit 16

Figure 7:
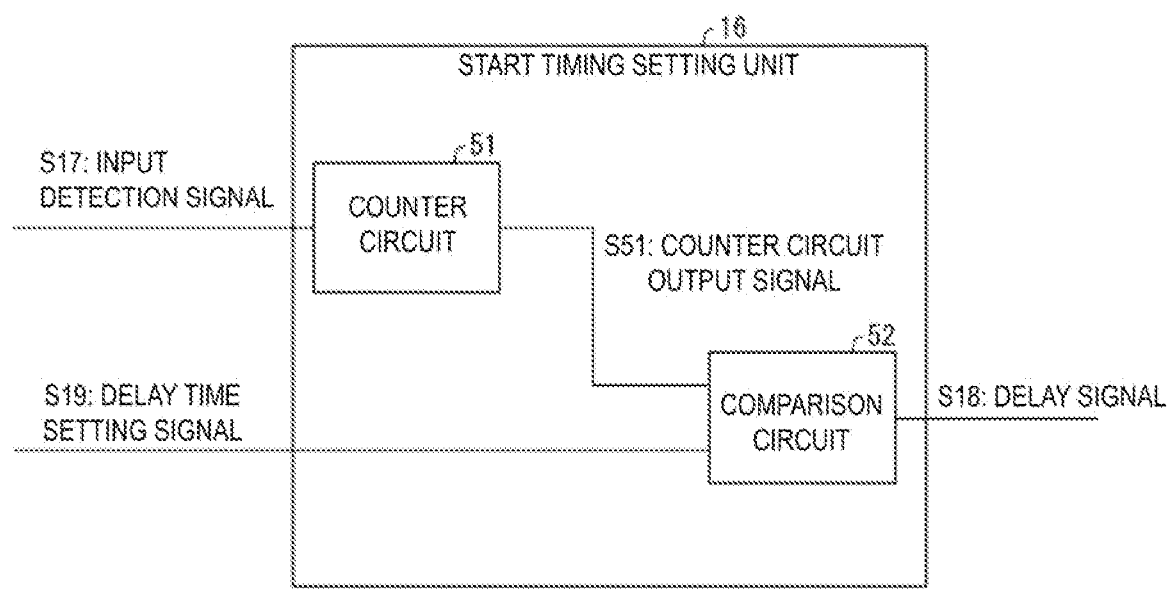
FIG. 7 is a block diagram illustrating a functional configuration of the start timing setting unit.

A configuration of main portions of the start timing setting unit 16 will be described by using FIG. 7. As illustrated in FIG. 7, the start timing setting unit 16 includes a counter circuit 51 and a comparison circuit 52. The input detection signal S17 output from the synchronization signal input unit 15 is directly input to the counter circuit 51. The counter circuit 51 starts time measurement from the timing when the input detection signal S17 is input. Further, the counter circuit 51 sequentially outputs a counter circuit output signal S51 that represents a digital value (output value) after the start of the time measurement.

The counter circuit output signal S51 output from the counter circuit 51 and a delay time setting signal S19 are input to the comparison circuit 52. The delay time setting signal S19 is a signal for transmitting a setting value of the delay time to the comparison circuit 52, and is output from the sensor controller 11 with the fact that the counter circuit output signal S51 has been output from the counter circuit 51 being as a trigger. The setting value of the delay time is stored in a register (rot illustrated) in the sensor controller 11 by inputting the input signal S11 representing the setting value in the sensor controller 11.

The input signal S11 is output from the display device by, for example, the user performing a setting operation of the delay time on the display screen 61 of the display device of the electronic device 60. Note that the setting value of the delay time is not set by the input signal S11, but may be stored in advance in the register on a manufacturing stage of the proximity sensor 10, for example.

The comparison circuit 52 compares the digital value of the counter circuit output signal S51 sequentially output from the counter circuit 51 after the start of the time measurement with the setting value of the delay time setting signal S19. Then, when the digital value of the counter circuit output signal S51 matches the setting value of the delay time setting signal S19, the comparison circuit 52 outputs the delay signal S18 to the sensor controller 11. The start timing setting unit 16, specifically the comparison circuit 52, sets the start timing by outputting the delay signal S13.

As described above, the start timing setting unit 16 can delay the start timing by a desired period of time from the timing where the vertical synchronization signal S16 is input. Note that the circuit configuration of the start timing setting unit 16 illustrated in FIG. 7 and the output method of the delay signal S18 described above are merely examples, and any circuit configuration and output technique may be employed.

Overview of Sensor Controller 11 and the Like

Figure 13:
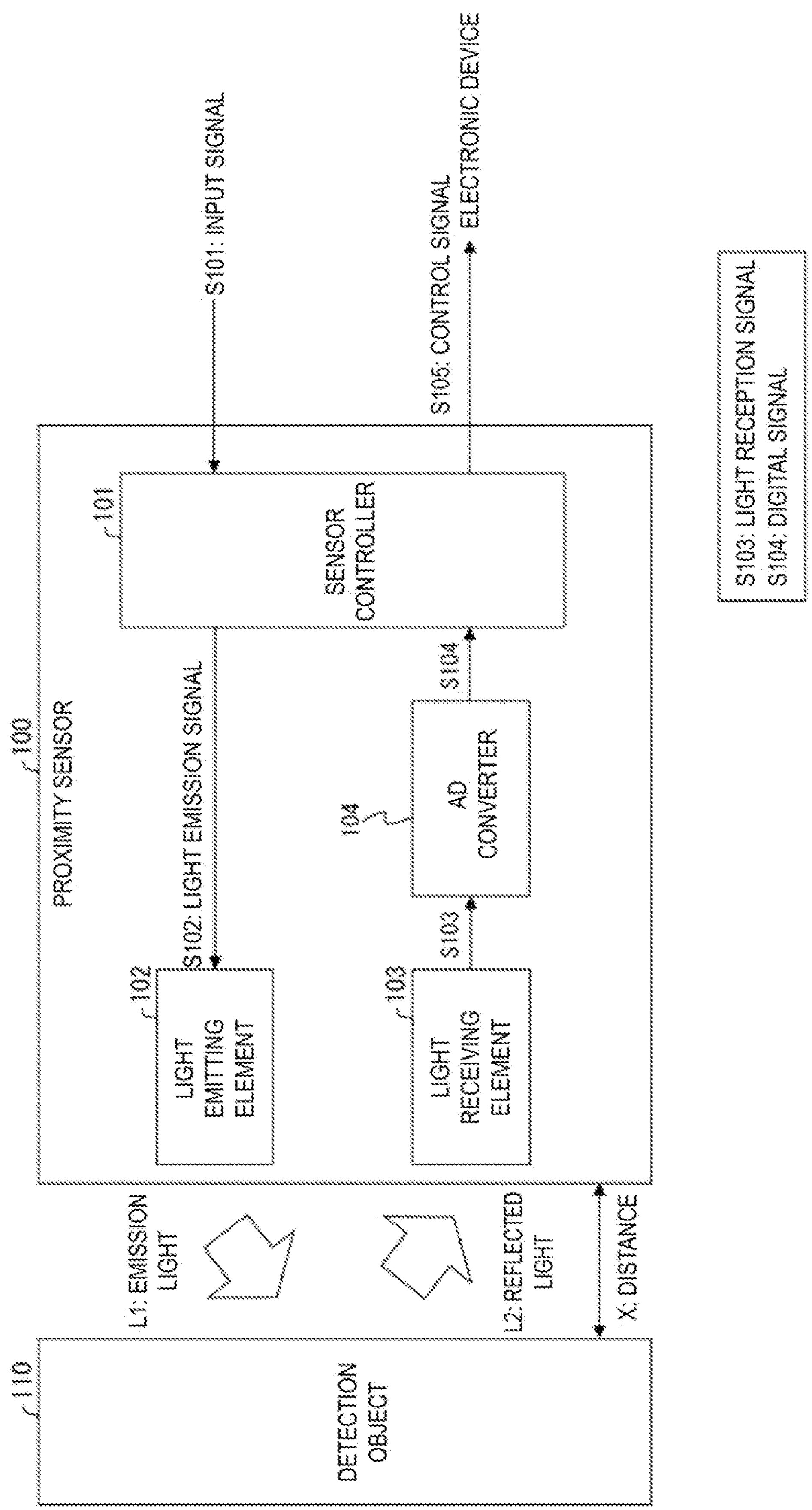
FIG. 13 is a block diagram illustrating a functional configuration of the proximity sensor.
Figure 14:
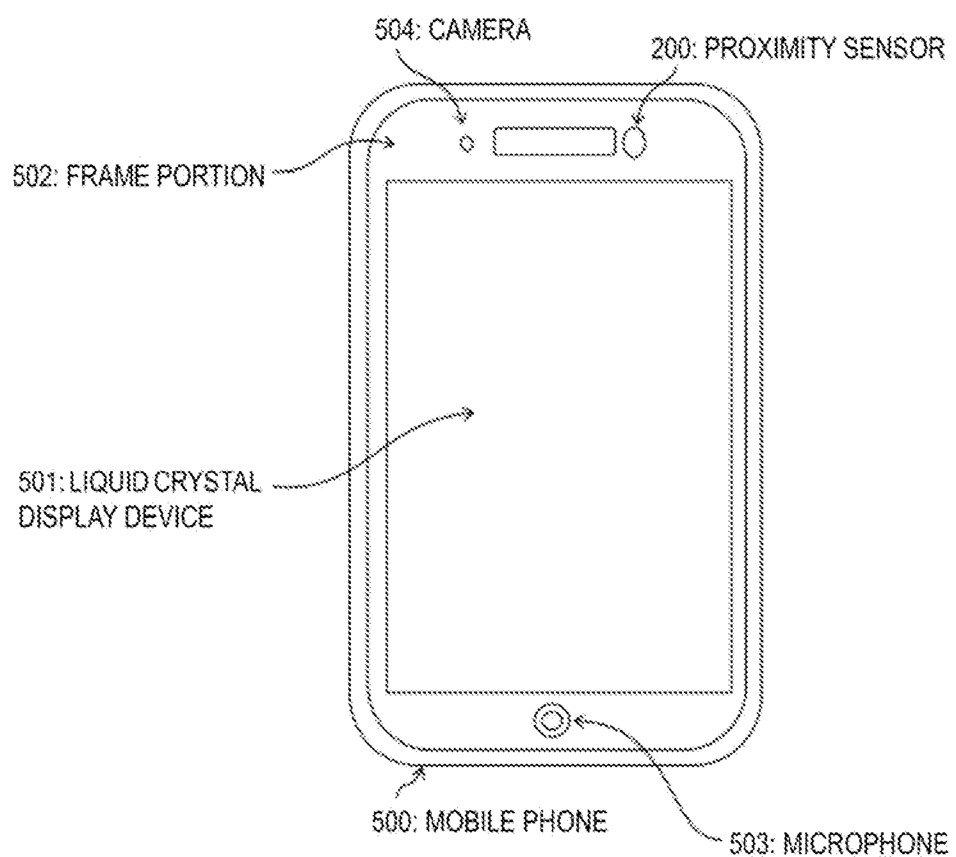
FIG. 14 is a front view illustrating a schematic configuration of a typical mobile phone equipped with a liquid crystal display device.
Figure 15:
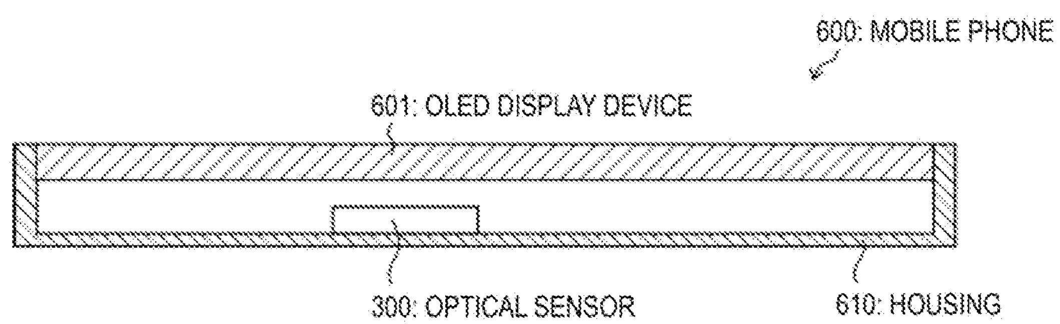
FIG. 15 is a cross-sectional view illustrating a schematic configuration of a typical mobile phone equipped with an OLED display device.

The delay signal S18 output from the start timing setting unit 16 is input to the sensor controller 11. When the start timing comes, the sensor controller 11 to which the delay signal S18 is input outputs the light emission signal S12 as illustrated in FIG. 3, and causes the light emitting element 12 to emit light. Further, the sensor controller 11 comprehensively controls each portion and each circuit of the proximity sensor. Furthermore, the sensor controller 11 outputs the control signal S15 to the electronic device 60. The control signal S15 is identical to the control signal S105 output from the sensor controller 101 of the typical proximity sensor 100 (see FIG. 13).

The light emitting element 12 is an element that emits light for detecting a detection object, and is, for example, a Light Emitting Diode (LED) or a semiconductor laser element. Since the LED and the semiconductor laser element are supplied with a current to emit light, when the LED or the semiconductor laser element is used as the light emitting element 12, the light emitting element 12 is used in combination with a current driving circuit (not illustrated). Furthermore, infrared light that, cannot be recognized by the human eyes is common as light to be emitted from the light emitting element 12.

A semiconductor light receiving element such as a photodiode is generally used for the light receiving element 13. The photodiode is an element that generates a current by detecting light. The light receiving element 13 generates a current by receiving reflected light generated by reflection of light emitted from the light emitting element 12 (for example, infrared light) by the detection object (see FIG. 12). Then, the light receiving element 13 outputs a light reception signal S13 representing a current value of the generated current to the AD converter 14.

The AD converter 14 is configured of an integrator circuit, a comparator circuit (both of which are not illustrated), and the like, and performs AD conversion of the light reception signal S13, which is an analog signal, into the digital signal S14 by detecting a charge amount of charges flowing into the AD converter 14 in accompany with the input of the light reception signal S13. The digital signal S14 generated by the AD converter 14 represents a digital value correlated with a distance between the proximity sensor 10 and the detection object, and is output to the sensor controller 11.

The sensor controller 11 may directly output the digital value of the input digital signal S14 to the electronic device 60. Additionally, when the sensor controller 11 includes a determination circuit configured to compare the digital value of the digital signal S14 to a preset threshold value, the sensor controller 11 may determine whether the detection object is close to or far from the proximity sensor 10 with the threshold value being as a reference to output the determination result as a one-bit signal.

For example, when a digital value of "100 mm" is set as a threshold value with a case where a distance between the proximity sensor 10 and the detection object is 100 mm being as a reference, it is possible to determine whether the detection object is close to or far from the proximity sensor 10 with respect to the distance of 100 mm. Then, when the distance between the proximity sensor 10 and the detection object is closer than 100 mm, "0" is output, whereas when the distance is farther then 100 mm, "1" is output, and thus, the determination result can be output as the one-bit signal.

Method of Setting Detection Timing in Proximity Sensor 10

Figure 9:
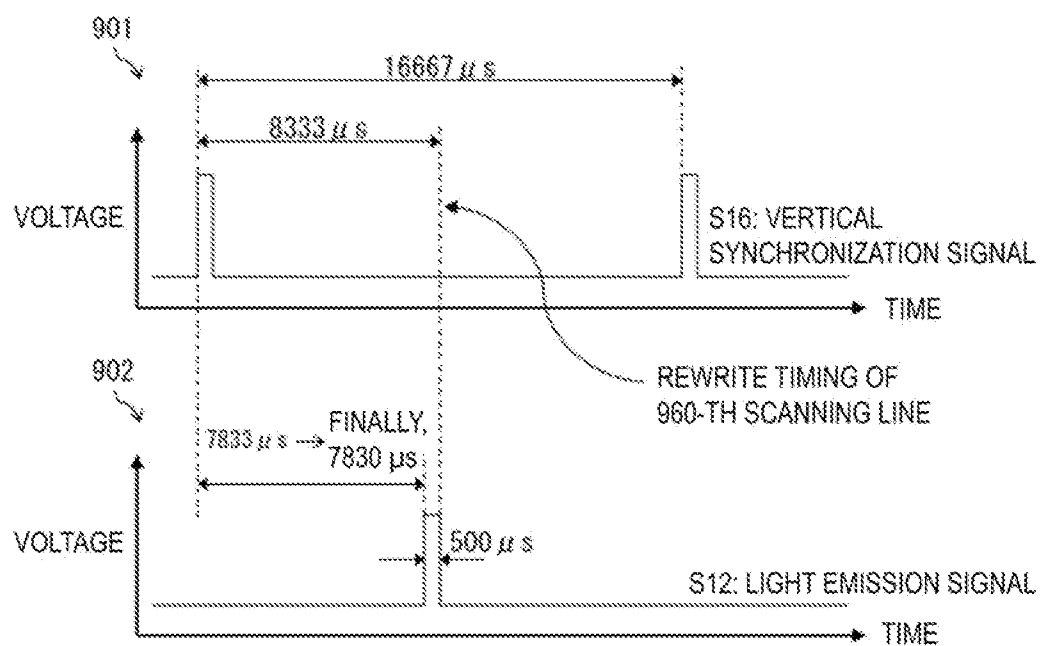
In FIG. 9, a reference sign 901 is a diagram illustrating operation timings of a vertical synchronization signal input to the synchronization signal input unit. A reference sign 902 is a diagram illustrating an operation timing of a light emission signal output from a sensor controller according to the first embodiment of the present disclosure.

A method of setting a detection timing in the proximity sensor 10 will be described by using FIG. 3 and FIG. 9. The detection timing is a concept including both a detection start timing at which the proximity sensor 10 starts detection of the detection object and a detection end timing at which the proximity sensor 10 ends the detection of the detection object. The detection start timing is, in other words, a start timing set by the start timing setting unit 16, that is, a timing at which the light emitting element 12 starts emission of light. The detection end timing is a timing at which the light, emitting element 12 ends the emission of the light.

Figure 8:
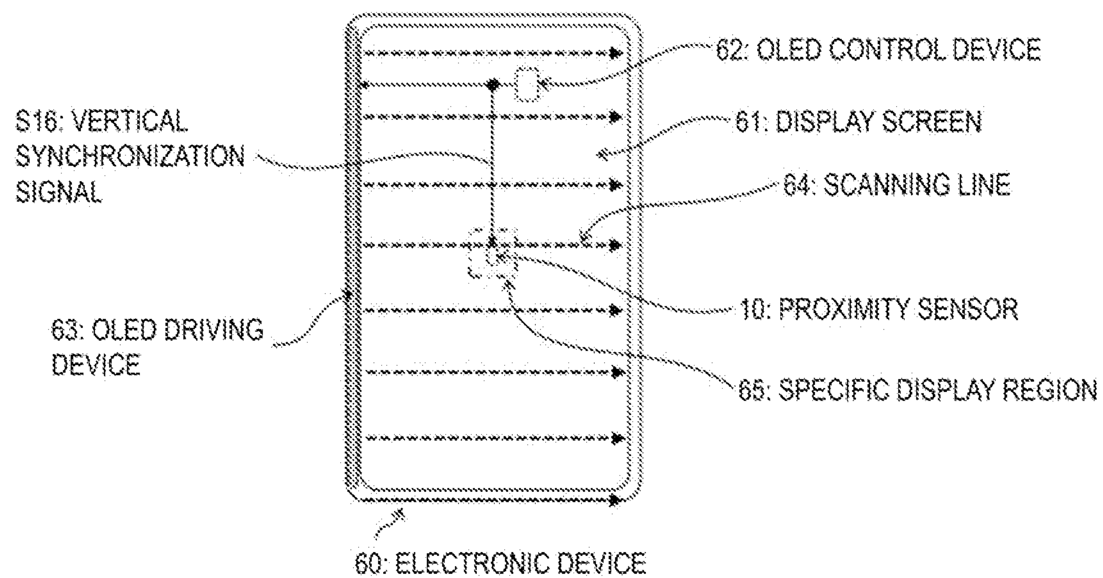
FIG. 8 is a front view illustrating a schematic configuration of the electronic device according to the first embodiment of the present disclosure.

As illustrated in FIG. 8, a screen size of the display screen 61 increased in the electronic device 60, and thus, the frame portion of the housing of the electronic device 60 has a small surface area in a front view. The frame portion is a portion that surrounds the periphery of the display device in the housing of the electronic device 60. Thus, in the electronic device 60, it is difficult to form, in the frame portion of the housing, an opening for passing light emitted from the proximity sensor 10 and reflected light by the detection object through the housing. Due to this, as illustrated in FIG. 8, the proximity sensor 10 is disposed in the space on the back face of the display device (specifically, the display screen 61) in an inner side of the housing.

The proximity sensor 10 may be disposed anywhere within the space, for example, at a position where the proximity sensor 10 can detect the presence of the detection object most widely (hereinafter referred to as a "target position"). When the proximity sensor 10 is disposed at the target position, light emitted from the proximity sensor 10 and reflected light by the detection object are transmitted in the display region of the display screen 61 corresponding to the target position.

The display region of the display screen 61 corresponding to such a target position serves as the specific display region 65 as illustrated in FIG. 8. That is, it can be said that the proximity sensor 10 is an optical sensor of the photodetection method disposed at a position (target position) corresponding to a position where the specific display region 65 is disposed on the display screen 61 of the display device. In the present embodiment, as illustrated in FIG. 8, a space corresponding to a display region at or near the center of the display screen 61 within the housing of the electronic device 60 is a target position, and the proximity sensor 10 is disposed at the target position.

Rewriting of the image in the display device of the electronic device 60 is controlled by an OLED control device 62 and an OLED driving device 63. The OLED control device 62 outputs, to the OLED driving device 63, the image and a synchronization signal that is used for determining a timing when the display device rewrites the image. Examples of the synchronization signal may include the vertical synchronization signal S16 and the horizontal synchronization signal S86, and in the present, embodiment, the synchronization signal is the vertical synchronization signal S16.

Depending on the synchronization signal and the image that are output from the OLED control device 62, the OLED driving device 63 sequentially outputs a voltage for causing the display device to rewrite the image to the display device. The arrow lines indicated by the dotted lines on the display screen 61 in FIG. 8 indicate the scanning lines 64 of the image displayed on the display screen 61 of the display device.

Hereinafter, description will be given of a method of setting the detection timing in the proximity sensor 10 by using, as an example, a case in which the display device has the full high-definition resolution of 1920×1030 and the frame rate of 60 Hz. In addition, in the following description, the emission time of the light in the light emitting element 12 of the proximity sensor 10 is 500 μs indicated by a reference sign 902 in FIG. 9. Note that the emission time of the light from the light emitting element 12 is typically set to from several hundreds of μs to several ms, in consideration of sensitivity, a response speed, and current consumption of the proximity sensor 10. However, the emission time of the light from the light emitting element 12 may be set by, for example, a register of the sensor controller 11.

When the frame rate of the display device is 60 Hz, the image is rewritten at a cycle of approximately 16667 μs, so each of the seaming lines 64 of the image displayed on the display screen 61 of the display device is updated at 16667 μs/1920≈8.68 μs per one scanning line. When a position where the proximity sensor 10 is disposed is described by using the number of scanning lines 64, the proximity sensor 10 is disposed at a target position corresponding to a portion at or near a generation position of a 960-th scanning line 64 in the display screen 61. The 960-th scanning line 64 is rewritten after 8.68 μs×960≈8333 μs from the input of the vertical synchronization signal S16 to the synchronization signal input unit 15, as indicated by a reference sign 901 in FIG. 9.

Here, when the proximity sensor 10 is disposed at the target position, an abnormal point is generated on the display screen 61 due to transmission of light (infrared light) emitted from the light emitting element 12 of the proximity sensor 10 through the display device. In order to make a generation duration of the abnormal point as short as possible, it is necessary to end the emission of the light from the light emitting element 12 immediately before the start of rewriting of the 960-th scanning line 64. In addition, the number of scanning lines 64 that is rewritten during an emission duration of the light from the light emitting element 12 needs to be as small as possible. In other words, a timing immediately before the start of rewriting of the 960-th scanning line 64 needs to be defined as the detection end timing, and a start timing at which the number of scanning lines 64 that are rewritten during the emission duration of the light from the light emitting element 12 is made as small as possible needs to be defined as the detection start timing.

Specifically, the delay time may be set in consideration of the rewrite timing and the emission duration of the light from the light emitting element 12 (i.e., the emission time of the light). In other words, the delay time may be set according to a differential time that is a difference between a reference time from the timing when the vertical synchronization signal S16 is input to the synchronization signal input unit 15 to the start timing of rewriting of the 960-th scanning line 64 and the emission time of the light from the light emitting element 12. In this example, the reference time is 8333 μs, and the emission time of the light from the light emitting element 12 is 500 μs. Thus, the differential time is 8333 μs−500 μs=7833 μs. Here, when the adjustment width of the delay time by the start timing setting unit 16 is in units of 10 μs, 7830 μs may be set as the delay time, for example, because the timing immediately before the 960-th scanning line 64 starts to be rewritten reeds to be set as the detection end timing.

The calculation of the delay time described above can be performed by using Relationship (1) below. That is, the delay time Time_Delay may be a maximum value satisfying Relationship (1) below.

$$\text{Time\_Delay} < (1/f)/\text{Num\_}H \times H - \text{Time\_IR} \quad (1)$$

F [Hz]: a frame rate of a display device

Num_H [the number of lines]: a total value of the number of scanning lines 64 of an image displayed on the display screen 61

Time_IR [μs]: an emission time of light from the light emitting element 12 when the proximity sensor 10 is installed at a target position corresponding to a display region of the scanning line 64 that is rewritten in the H-th in the display screen 61

Time_Delay [μs]: delay time

Second Embodiment

Figure 10:
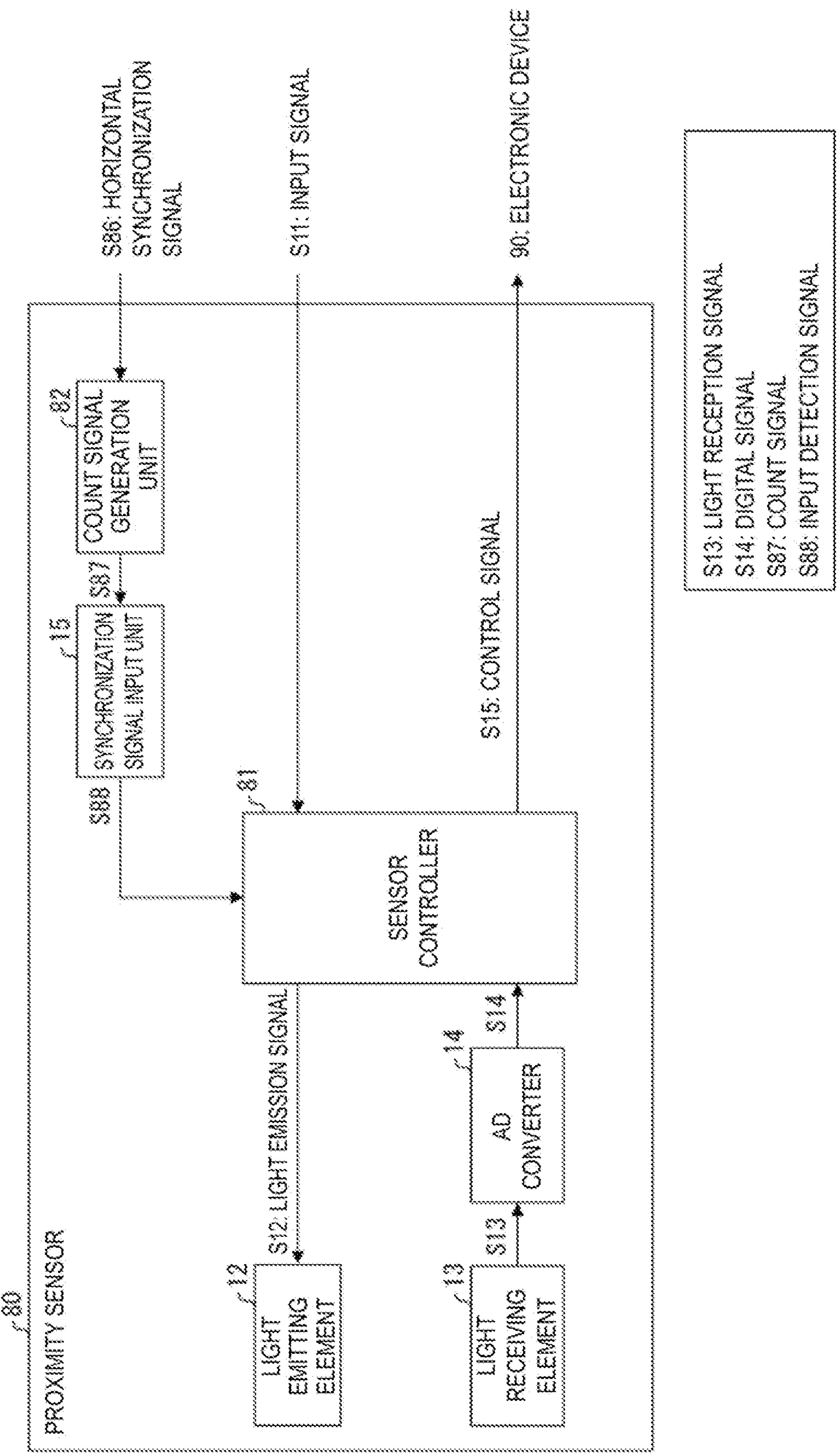
FIG. 10 is a block diagram illustrating a functional configuration of a proximity sensor according to the second embodiment of the present disclosure.
Figure 11:
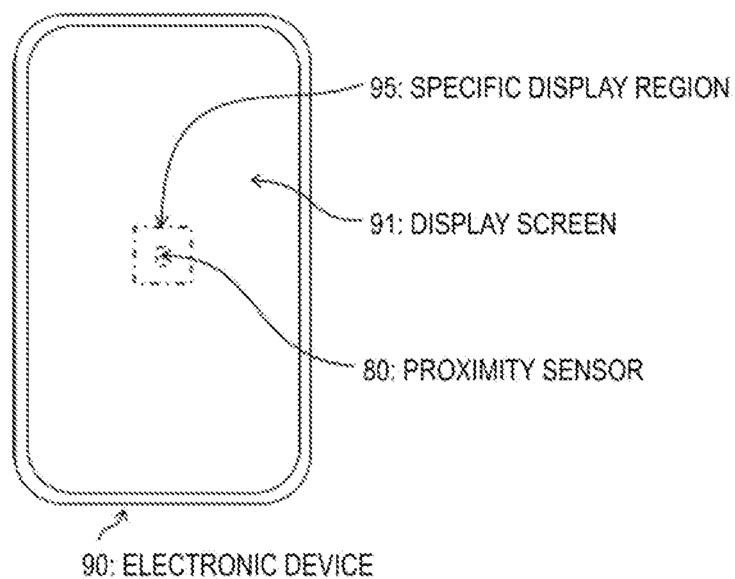
FIG. 11 is a front, view illustrating a schematic configuration of the electronic device according to the second embodiment of the present disclosure.

The second embodiment of the present disclosure will be described with reference to FIG. 10 and FIG. 11. The electronic device 90 according to the second embodiment of the present disclosure differs from the electronic device 60 according to the first embodiment of the present disclosure in that the electronic device 90 includes the proximity sensor 80 instead of the proximity sensor 10. Note that the display screen 91 of the display device of the electronic device 90 is identical to the display screen 61 of the display device of the electronic device 60. In addition, a specific display region 95 in the display screen 91 is identical to the specific display region 65 in the display screen 61.

The proximity sensor 80 according to the second embodiment of the present disclosure differs from the proximity sensor 10 according to the first embodiment of the present disclosure in that the proximity sensor 80 does not include the start timing setting unit 16, and includes a sensor controller 81 instead of the sensor controller 11, and the count signal generation unit 82.

Configuration of Main Portions of Proximity Sensor 80

A configuration of main portions of the proximity sensor 80 will be described by using FIG. 10. As illustrated in FIG. 10, in the proximity sensor 80, the horizontal synchronization signal S86 sequentially output from the display device is input to the court signal generation unit 82. The count signal generation unit 82 generates a count signal S87 that can be used as a synchronization signal based on the input horizontal synchronization signal S86.

Specifically, the count signal generation unit 82 counts the number of the input horizontal synchronization signals S86. Then, the count signal generation unit 82 generates the count signal S87 when the identical number of horizontal synchronization signals S86 to the total number of from the first scanning line 64 (see FIG. 8) displayed on the display screen 91 illustrated in FIG. 11 to the scanning line 64 that is generated in the specific display region 95 is counted. Then, the count signal generation unit 82 outputs the generated count signal S87 to the synchronization signal input unit 15.

The synchronization signal input unit 15 is input with the count signal S87 as a synchronization signal to generate an input detection signal S88. Then, the synchronization signal input unit 15 outputs the generated input detection signal S38 to the sensor controller 81. The input detection signal S83 is identical to the input detection signal S17 output from the synchronization signal input unit 15 according to the first embodiment of the present disclosure, and a method of generating the input detection signal S88 is also identical to that of the synchronization signal input unit 15 according to the first embodiment of the present disclosure.

The sensor controller 81 sets the start timing to the timing when the count signal S87 is input to the synchronization signal input unit 15. Specifically, the sensor controller 81 sets the start timing to the timing when the input detection signal S38 output from the synchronization signal input unit 15 is input to the sensor controller 11. Then, the sensor controller 81 outputs the light emission signal S12 to the light emitting element 12 at the start timing when the input detection signal S88 is input. The other functions of the sensor controller 81 are identical to those of the sensor controller 11 according to the first embodiment of the present disclosure. Further, a series of operations following the output of the light emission signal S12 of the sensor controller 81 by each portion of the proximity sensor 30 is identical to that of the proximity sensor 10 according to the first embodiment of the present disclosure.

By providing the count signal generation unit 82 in this manner, the proximity sensor 30 can operate while reducing the generation duration of the abnormal point, even when the horizontal synchronization signal S86 is set as the synchronization signal, and even when the start timing setting unit 16 is not provided.

Method of Setting Detection Timing in Proximity Sensor 80

A method of setting a detection timing in the proximity sensor 80 will be described by using FIG. 11. Note that the position where the proximity sensor 80 is disposed in the inner side of the housing of the electronic device 90 is identical to that of the electronic device 60 according to the first embodiment of the present disclosure as illustrated in FIG. 11.

Also, similar to the display device according to the first embodiment of the present disclosure, the display device according to the present embodiment has the frame rate of 60 Hz and full high-definition resolution of 1920×1080. Furthermore, the emission time of the light from the light emitting element 12 is 500 μs in a similar manner to that in the first embodiment.

Since the image is rewritten at a cycle of approximately 1666 μs, each of the scanning lines 64 of the image to be displayed on the display screen 91 of the display device is updated at approximately 8.68 μs per one scanning line. Thus, the number of scanning lines 64 that are rewritten during the emission duration of light (emission time: 500 μs) from the light emitting element 12 is 500 μs/8.68≈58.

Here, the position where the proximity sensor 80 is disposed corresponds to a portion at or near the display region of the 960-th scanning line 64, as described by the number of scanning lines 64. In addition, the display device according to the present embodiment is identical to the display device according to the first embodiment in that the detection end timing is set as a timing immediately before the start timing of rewriting of the 960-th scanning line 64, and the detection start timing is set as the start timing when the number of scanning lines 64 that are rewritten during the emission duration of the light from the light emitting element 12 is made as small as possible. Thus, by inputting the horizontal synchronization signal S36 indicating the start of rewriting of the 960−58=902-th scanning line 64 to the count signal generation unit 82, the proximity sensor 80 can shorten the generation duration of the abnormal point without adjusting the start timing.

The calculation of the horizontal synchronization signal S36 described above can be performed by using Equation (2) below.

$$\text{Sel\_hsync}=H-\text{Time\_IR}/\{(1/f)/\text{Num\_}H\} \quad (2)$$

F [Hz]: a frame rate of a display device

Num_H [the number of lines]: a total value of the number of scanning lines 64 of an image displayed on the display screen 61

Time_IR [μs]: an emission time of light from the light emitting element 12 when the proximity sensor 80 is installed at a target position corresponding to a display region of the scanning line 64 that is rewritten in the H-th in the display screen 61

Sel_hsync: a horizontal synchronization signal input to the count signal generation unit 82

Supplement

A proximity sensor (10, 80) according to a first aspect of the present disclosure is a proximity sensor disposed at a position corresponding to a position disposed with a specific display region (65, 95) on a display screen (61, 91) of a display device where at least a part of incident light incident from outside is transmitted through a back face, configured to detect whether or not a detection object is close to the display screen, and including a light emitting element (12) configured to emit light, a synchronization signal input unit (15) configured to be input with a synchronization signal which is output from the display device and which indicates a rewrite timing of an image displayed on the display screen, and an emission controller (sensor controller 11, 81) configured to control emission of the light from the light emitting element, wherein the emission controller is configured to cause the light emitting element to start the emission of the light at a start timing set based on the rewrite timing at which rewriting of one of a plurality of scanning lines (64) of the image is caused to start in the specific display region, and an emission time of the light from the light emitting element, and the emission controller is configured to cause the light emitting element to end the emission of the light before the rewrite timing comes.

According to the configuration, the emission controller can control the start timing so that a time when the one of the plurality of scanning lines of the image is being rewritten in a display region other than the specific display region in the display screen, and the emission time of the light do not overlap with each other as much as possible, in consideration of the rewrite timing and the emission time of the light. In addition, the emission controller can control the start, timing so that the rewrite timing comes immediately after the end of the emission of the light from the light emitting element, in consideration of the rewrite timing and the emission time of the light.

Due to these facts, the proximity sensor according to an aspect of the present disclosure can prevent the generation of an abnormal point in the specific display region of the display screen of the display device. In addition, even in the display region other than the specific display region in the display screen (hereinafter, referred to as an "out-of-target display region"), it is possible to reduce the generation of the abnormal point. Thus, the proximity sensor according to the aspect of the present disclosure can reduce a generation duration of the abnormal point for the entire display screen of the display device.

A proximity sensor (10) according to a second aspect of the present disclosure, wherein, in the first aspect, the display device may be configured to output a vertical synchronization signal (S16) indicating a start of rewriting of the image as the synchronization signal, and may further include a start timing setting unit (16) configured to set the start timing according to a differential time between a reference time from a timing when the vertical synchronization signal is input to the synchronization signal input unit to the rewrite timing and the emission time.

According to the configuration, in a case where the vertical synchronization signal is input to the synchronization signal input unit, the start timing setting unit can set the start timing so that a time when the one of the plurality of the scanning lines of the image is being rewritten in an out-of-target display region and the emission time do not overlap with each other in consideration of the differential time. In addition, the start timing setting unit can set the start timing so that the rewrite timing comes immediately after the end of the emission of the light from the light emitting element in consideration of the rewrite timing and the emission time. Thus, the proximity sensor according to the aspect of the present disclosure can reduce a generation duration of an abnormal point for the entire display screen of the display device.

A proximity sensor according to a third aspect of the present disclosure, wherein, in the second aspect, the start timing setting unit may include a counter circuit (51) configured to start time measurement from the timing when the synchronization signal is input to the synchronization signal input unit, and a comparison circuit (52) configured to compare an output value sequentially output from the counter circuit after the start of the time measurement with a value of the differential time and configured to set the start timing in a case where the output value and the value of the difference time coincide with each other.

According to the configuration, the start timing can be accurately set when the comparison circuit of the start timing setting unit reaches or exceeds the differential time. Thus, the proximity sensor according to the aspect of the present disclosure can further reduce a generation duration of an abnormal point for the entire display screen of the display device by appropriately setting the differential time according to specifications and the like of the display device and the proximity sensor.

A proximity sensor (80) according to a fourth aspect of the present disclosure, wherein, in the first aspect, the display device may be configured to sequentially output a horizontal synchronization signal (S86) indicating a start of rewriting of one of the plurality of scanning lines, and may further include a count signal generation unit (82) configured to count the number of the horizontal synchronization signals output from the display device, and configured to generate a count signal (S87) when an identical number of the horizontal synchronization signals to a total number of the scanning lines from a first scanning line among the plurality of the scanning lines to be displayed on the display screen (91) to the scanning line to be displayed in the specific display region (95) are counted, the synchronization signal input unit may be configured to be input with the count signal output from the count signal generation unit as the synchronization signal, and the emission controller (a sensor controller 81) may be configured to set the start timing to a timing when the count signal is input to the synchronization signal input unit.

According to the configuration, the emission controller sets the start timing to a timing when the count signal as the synchronization signal is input to the synchronization signal input unit. Because of this, it is not necessary to set the start timing according to a differential time, and thus unintentional deviation between the start timing and the rewrite timing due to the calculation accuracy of the differential time does not occur. Thus, it is possible to achieve a reduction in generation duration of an abnormal point with high accuracy for the entire display screen of the display device.

The proximity sensor (10, 80) according to a fifth aspect of the present disclosure, wherein, in the first to fourth aspects described above, the synchronization signal input unit may include a polarity inversion unit (31) configured to invert, according to polarity of the input synchronization signal, the polarity, and an edge detection unit (32) configured to detect an edge of an inversion signal output from the polarity inversion unit.

According to the configuration, the synchronization signal input unit can detect the start of rewriting of the image with constant precision by the edge detection unit without being influenced due to polarity and a pulse width of the synchronization signal that are different for each electronic device and for each display device. Furthermore, regardless of the polarity of the input synchronization signal, the synchronization signal input unit can detect the start of rewriting of the image with constant precision. Thus, regardless of the polarity and the pulse width of the synchronization signal, the proximity sensor according to the aspect of the present disclosure can stably shorten a generation duration of an abnormal point for the entire display screen of the display device.

An electronic device (60, 90) according to a sixth aspect of the present disclosure includes the proximity sensor (10, 80) according to any one of the first to fifth aspects, and the display device. According to the configuration described above, effects similar to those of the disclosure according to the first aspect of the present disclosure are exhibited.

SUPPLEMENTARY INFORMATION

An aspect of the present disclosure is not limited to each of the above-described embodiments. It is possible to make various modifications within the scope of the claims. An embodiment obtained by appropriately combining technical elements each disclosed in different embodiments falls also within the technical scope of the aspect of the present, disclosure. Furthermore, technical elements disclosed in the respective embodiments may be combined to provide a new technical feature.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A proximity sensor is a proximity sensor disposed at a position corresponding to a position disposed with a specific display region on a display screen of a display device where at least a part of incident light incident from outside is transmitted through a back face and configured to detect whether or not a detection object is close to the display screen, the proximity sensor comprising:

a light emitting element configured to emit light;

a synchronization signal input circuit that inputs with a synchronization signal which is output from the display device and which indicates a rewrite timing of an image displayed on the display screen; and an emission controller configured to control emission of the light from the light emitting element, wherein the emission controller is configured to cause the light emitting element to start the emission of the light at a start timing set based on the rewrite timing at which rewriting of one of a plurality of scanning lines of the image is caused to start in the specific display region, and an emission time of the light from the light emitting element, and the emission controller is configured to cause the light emitting element to end the emission of the light before the rewrite timing comes.

2. The proximity sensor according to claim 1, wherein, the display device is configured to output a vertical synchronization signal indicating a start of rewriting of the image as the synchronization signal, and the display device further comprises a start timing setting circuit that sets the start timing according to a differential time between a reference time from a timing when the vertical synchronization signal is input to the synchronization signal input circuit to the rewrite timing, and the emission time.

3. The proximity sensor according to claim 2, wherein the start timing setting circuit further comprises:

a counter circuit configured to start time measurement from the timing when the synchronization signal is input to the synchronization signal input circuit, and a comparison circuit configured to compare an output value sequentially output from the counter circuit after the start of the time measurement with a value of the differential time and configured to set the start timing in a case where the output value and the value of the differential time coincide with each other.

4. The proximity sensor according to claim 1, wherein the display device is configured to sequentially output a horizontal synchronization signal indicating a start of rewriting of one of the plurality of the scanning lines, and the display device further comprises a count signal generation circuit that counts the number of the horizontal synchronization signals output from the display device and generates a count signal when an identical number of the horizontal synchronization signals to a total number of the scanning lines from a first scanning line among the plurality of the scanning lines to be displayed on the display screen to the scanning line to be displayed in the specific display region are counted, the synchronization signal input circuit that inputs with the count signal output from the count signal generation circuit as the synchronization signal, and the emission controller is configured to set the start timing to a timing when the count signal is input to the synchronization signal input circuit.

5. The proximity sensor according to claim 1, wherein the synchronization signal input circuit further comprises:

a polarity inversion circuit that inverts, according to polarity of the input synchronization signal, the polarity, and an edge detection circuit that detects an edge of an inversion signal output from the polarity inversion circuit.

6. An electronic device comprising:

the proximity sensor according to claim 1; and the display device.

* * * * *